(12) United States Patent
Eck et al.

(10) Patent No.: US 10,061,279 B2
(45) Date of Patent: Aug. 28, 2018

(54) MULTI-OBJECTIVE SCHEDULING FOR ON/OFF EQUIPMENT

(71) Applicant: International Business Machines Corporation, Armonk, NY (US)

(72) Inventors: Bradley Eck, Dublin (IE); Bissan Ghaddar, Dublin (IE); Akihiro Kishimoto, Dublin (IE); Joe Naoum-Sawaya, London (GB)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 14/868,778

(22) Filed: Sep. 29, 2015

(65) Prior Publication Data
US 2017/0090440 A1  Mar. 30, 2017

(51) Int. Cl.
| G05B 11/01 | (2006.01) |
| G05B 13/02 | (2006.01) |
| G05B 15/02 | (2006.01) |
| G06N 7/00 | (2006.01) |
| G06N 5/00 | (2006.01) |
| G05B 13/00 | (2006.01) |

(52) U.S. Cl.
CPC ............ *G05B 15/02* (2013.01); *G05B 13/00* (2013.01); *G06N 5/003* (2013.01); *G06N 7/00* (2013.01)

(58) Field of Classification Search
CPC .......... G06N 7/00; G06N 5/003; G05B 13/00; G05B 15/02
See application file for complete search history.

(56) References Cited

U.S. PATENT DOCUMENTS

| 5,347,446 A | * | 9/1994 | Iino | G05B 13/048 |
| | | | | 700/29 |
| 6,748,348 B1 | * | 6/2004 | Russell, II | G21D 3/001 |
| | | | | 700/28 |
| 7,707,125 B2 | | 4/2010 | Haji-Valizadeh | |
| 8,055,358 B2 | | 11/2011 | Blevins et al. | |
| 8,489,240 B2 | * | 7/2013 | Wan | C02F 1/008 |
| | | | | 137/11 |
| 8,873,698 B2 | * | 10/2014 | Kropaczek | G21C 17/00 |
| | | | | 376/409 |
| 8,880,202 B2 | | 11/2014 | Francino et al. | |

(Continued)

*Primary Examiner* — Ronald D Hartman, Jr.
(74) *Attorney, Agent, or Firm* — Scully, Scott, Murphy & Presser, P.C.; Kurt Goudy, Esq.

(57) ABSTRACT

An apparatus, method and computer program product for scheduling on/off control of equipment. The method implements an iterative approach that uses one objective and sets a tolerance value on the other objectives. Initially, the method computes the value of the different objective functions given a current feasible solution. The different objective functions are iteratively evaluated with respect to the current solution and a margin is set for every objective at each iteration. The margin is a deviation measure indicating the acceptable range by which each objective can be worsened. The method iteratively optimizes each objective function with respect to one of the objectives, following an order, while enforcing a maximum deviation on the other objective functions by setting them as constraints. The allowable deviation margin is then decreased for all the objective functions. A final output schedule is provided from which signals may be generated to automatically turn on/off the equipment.

22 Claims, 6 Drawing Sheets

(56) References Cited

U.S. PATENT DOCUMENTS

| | | | |
|---|---|---|---|
| 2007/0271077 A1 | 11/2007 | Kosmala et al. | |
| 2009/0204233 A1* | 8/2009 | Zhan | G05B 17/02 |
| | | | 700/29 |
| 2012/0046763 A1* | 2/2012 | Jia | G11B 5/59622 |
| | | | 700/55 |
| 2013/0110262 A1* | 5/2013 | Abramovitch | B82Y 35/00 |
| | | | 700/42 |
| 2016/0099567 A1* | 4/2016 | Sun | H02J 3/14 |
| | | | 700/296 |

* cited by examiner

MULTI-OBJECTIVE SCHEDULING FOR ON/OFF EQUIPMENT

FIELD

This disclosure relates generally to systems and methods of scheduling on/off control of equipment, and particularly to find operating schedules for equipment that is controlled in an on/off manner while taking into account multiple objectives and operating constraints.

BACKGROUND

A considerable amount of equipment has only two available operating states: on and off. Examples include pumps, compressors, grinders, computer servers, and many others. This equipment is used to meet an operational need, often multiple needs. Finding a schedule to meet even a single operational need at lowest cost is not easy because the number of possible schedules may be exponentially large.

For example, an hourly schedule covering one day for one piece of equipment has $2^{24}$ or about 1.7 million possibilities. The problem becomes even more difficult when multiple operating needs or objectives are considered.

Current operating schedules for equipment are mostly developed by manual analysis, or intuition-based on experience. In a minority of cases, computer aided decision support systems may provide a schedule based on a single objective or goal.

Approaches proposed in the current literature for multi-objective scheduling problem mainly fall into two categories: optimization techniques and meta-heuristics.

Optimization approaches utilize linear, nonlinear, dynamic, mixed, and integer programming to find the schedule that minimizes a single deterministic objective function related to the energy costs.

The pump scheduling optimization problem is complex as it involves a set of non-linear constraints and a set of binary decision variables. In order to make the problem tractable, simplifications are usually made through assumptions, discretization, or heuristic rules.

While sophisticated search and optimization techniques to solve this problem have been proposed, actual applications of such approaches have generally been restricted to few case studies because such approaches greatly simplify the complexities and interdependencies of real pumped fluid (e.g., water) distribution networks.

Hybrid optimization methods have been developed that combines linear programming (LP) with a local search strategy. In the first stage, an optimization model is run on the basis of the linearization of the entire water-distribution model. The second stage of the optimization involves the application of a local search algorithm which proved to be efficient in finding a local optimum by exploring the neighborhood of a solution for improvements.

Metaheuristics such as genetic algorithms and simulated annealing have also been used to tackle the multi-objective scheduling problems. Mainly, in water networks metaheuristics are coupled with a simulator to capture properties of the system. These approaches have been known to be effective in solving pump scheduling problems. Although such approaches do not require simplifications of the hydraulic model which makes them more powerful alternatives to classic optimization techniques however they still suffer from a fundamental drawback as they do not guarantee to find the optimal pump schedule. Additionally, metaheuristics may require a large number of simulation runs which is computationally expensive.

SUMMARY

A system, method and computer program product to automatically control a machine. The system and method particularly will provide an ability to automatically schedule the turning on or off of devices, e.g., such as machines, etc.

In one aspect, there is provided a method of scheduling on/off control of a piece of one or more pieces of equipment of a system. The method comprises: receiving at a processing device, a selection of an objective from among of a plurality of objectives achieved or impacted by turning on or off one or more pieces of equipment; the system objective represented by a corresponding objective function; receiving, at the processing device, an input margin setting for the objective representing an allowable deviation margin by which an objective may worsen during an iteration; providing a current solution to the corresponding objective function; iteratively evaluating a different objective and solving a corresponding objective function with respect to the current solution to optimize the current solution with respect to multiple objectives, and at each iteration, changing the margin setting value for every other objective not being evaluated in the current iteration to enforce a range by which the every other objective can be worsened at the current iteration; terminating the iterations to obtain a final solution comprising a schedule of times for on/off control of the one or more pieces of equipment, the schedule being optimal with respect to the multiple objectives; generating signals based on the schedule of on/off times for controlling the one or more pieces of equipment; and turning on or off the one or more pieces of equipment using the signals.

In a further aspect, there is provided an apparatus for scheduling on/off control of a piece of one or more pieces of equipment of a system. The apparatus comprises:

a memory storage device storing a program of instructions;

a processor device receiving said program of instructions to configure said processor device to: receive a selection of an objective from among of a plurality of objectives achieved or impacted by turning on or off one or more pieces of equipment; the system objective represented by a corresponding objective function; receive an input margin setting for the objective representing an allowable deviation margin by which an objective may worsen during an iteration; provide a current solution to the corresponding objective function; iteratively evaluating a different objective and solving a corresponding objective function with respect to the current solution to optimize the current solution with respect to multiple objectives, and at each iteration, changing the margin setting value for every other objective not being evaluated in the current iteration to enforce a range by which said every other objective can be worsened at the current iteration; terminate the iterations to obtain a final solution comprising a schedule of times for on/off control of said one or more pieces of equipment, the schedule being optimal with respect to the multiple objectives; generate signals based on the schedule of on/off times for controlling said one or more pieces of equipment; and turn on or off said one or more pieces of equipment using said signals.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
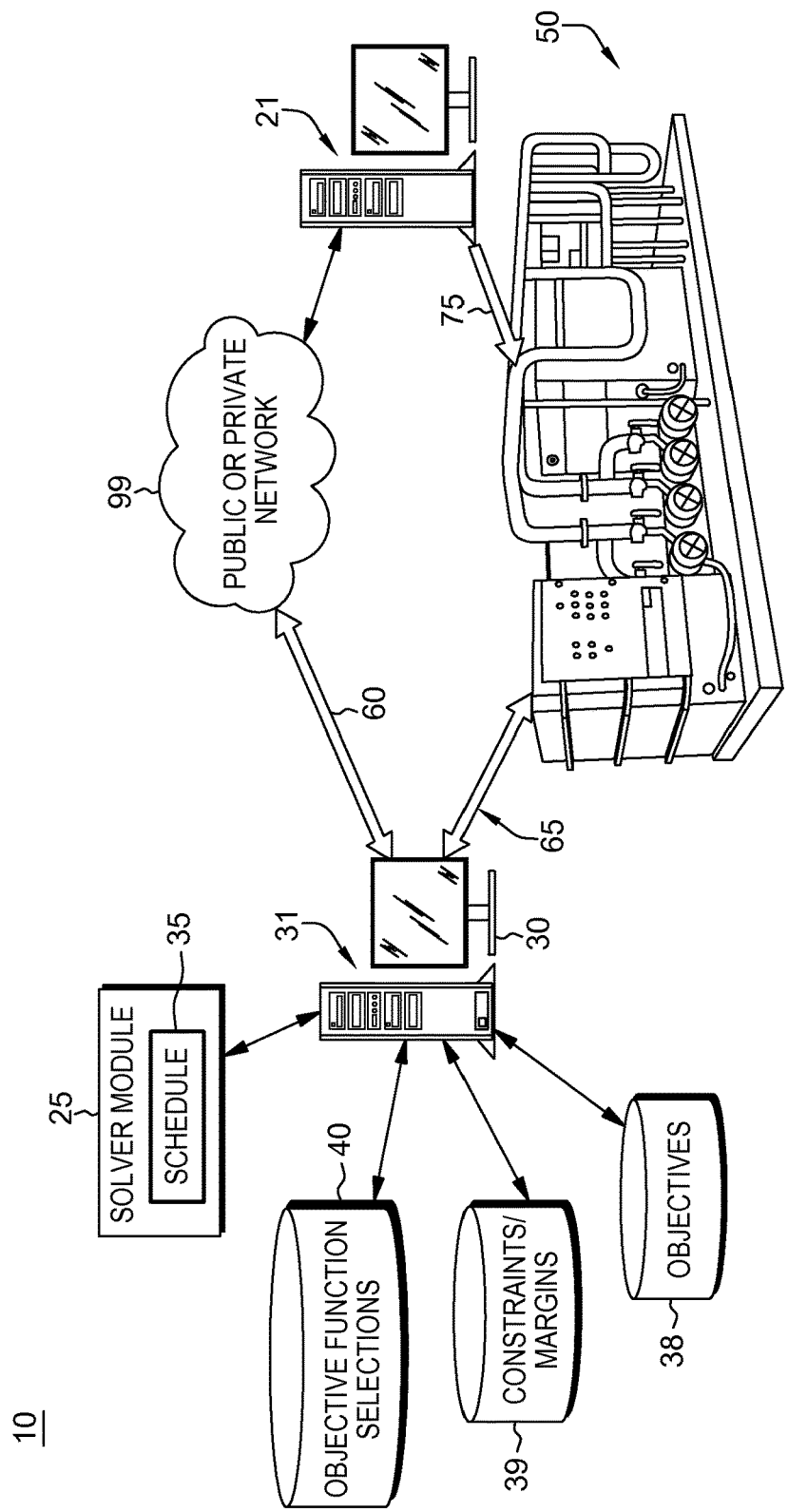
FIG. 1 depicts a computer-implemented system 10 for governing the operation of on/off equipment 50 according to one embodiment.

As shown in FIG. 1, there is provided a computer-implemented system 10 for governing the operation of on/off equipment 50 according to one embodiment. The system employs methods for optimally scheduling on or off of equipment in systems that meet objectives such as cost and quality. As non-limiting examples, exemplary systems which may have equipments subject to on/off control include water pumping and distribution systems, air conditioning systems, mobile phone networks and electricity/energy generation systems. The method further uses the optimized schedule to further automate the triggering of signals received by the pieces of equipment for on/off control thereof.

FIG. 1 shows a configuration of an analysis system 31 and may include a mathematical solver software component 25 configured to run on a computer device 30. The computer device 30 may perform simulations in the manner as described herein when evaluating objective functions with constraints. In performing the methods herein, computer device 30 is configured to receive input information such as: one or more objectives 38 such as obtained from a memory storage unit, and the input of one or more related constraints 39 such as obtained from the same or different memory storage unit. After performing initial analysis, and determining initialized values for margins, the method selects an objective function to be optimized such as obtained from a memory storage unit 40 and the solver is programmed to provide a solution to the optimization problem.

Alternatively, a user may specify and input via an interface to device 30, the objectives constraint limits and margins as used in the evaluation of the objective functions.

Figure 2:
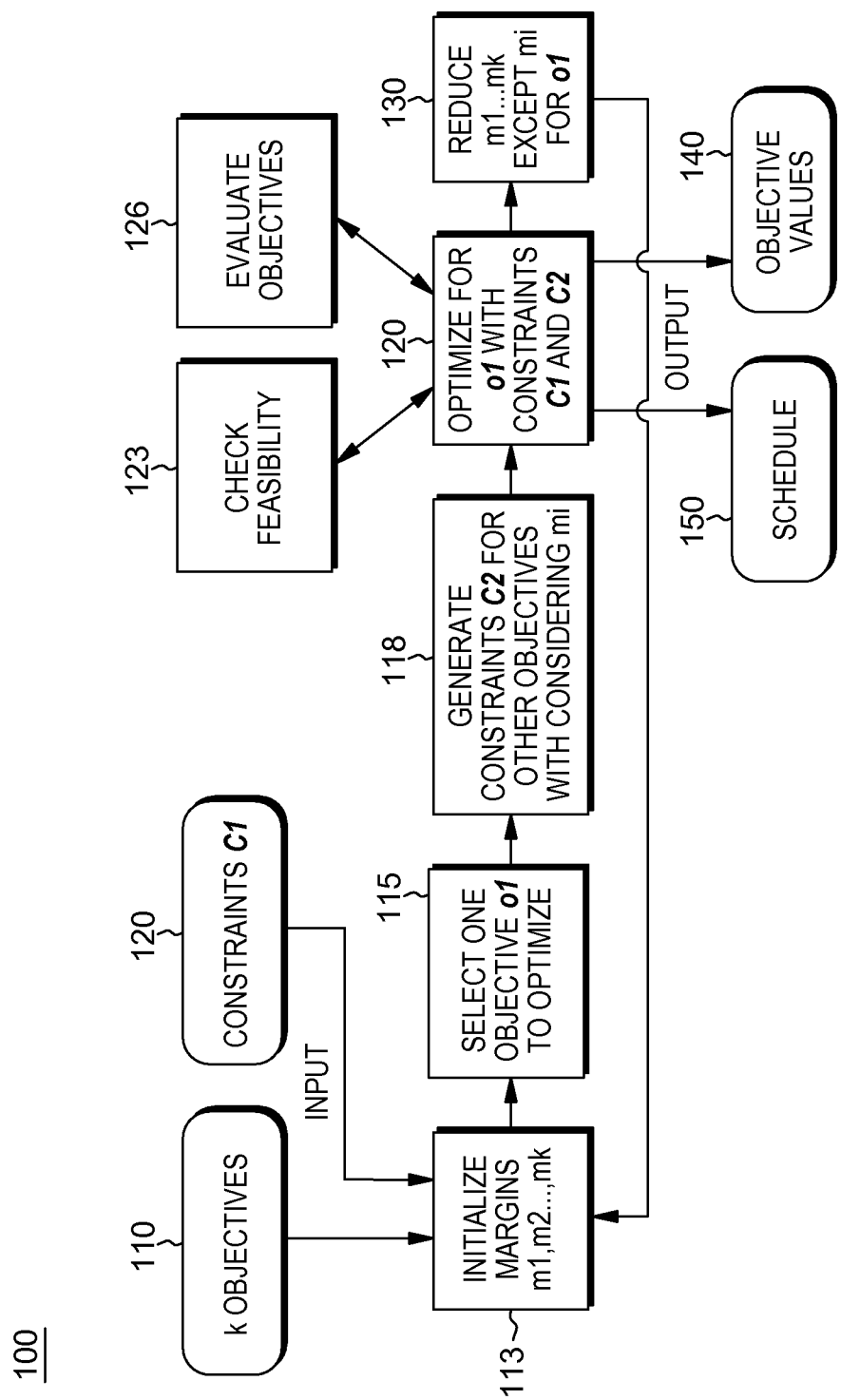
FIG. 2 shows a general method 100 of "multi-objective" scheduling according to one embodiment.
Figure 3:
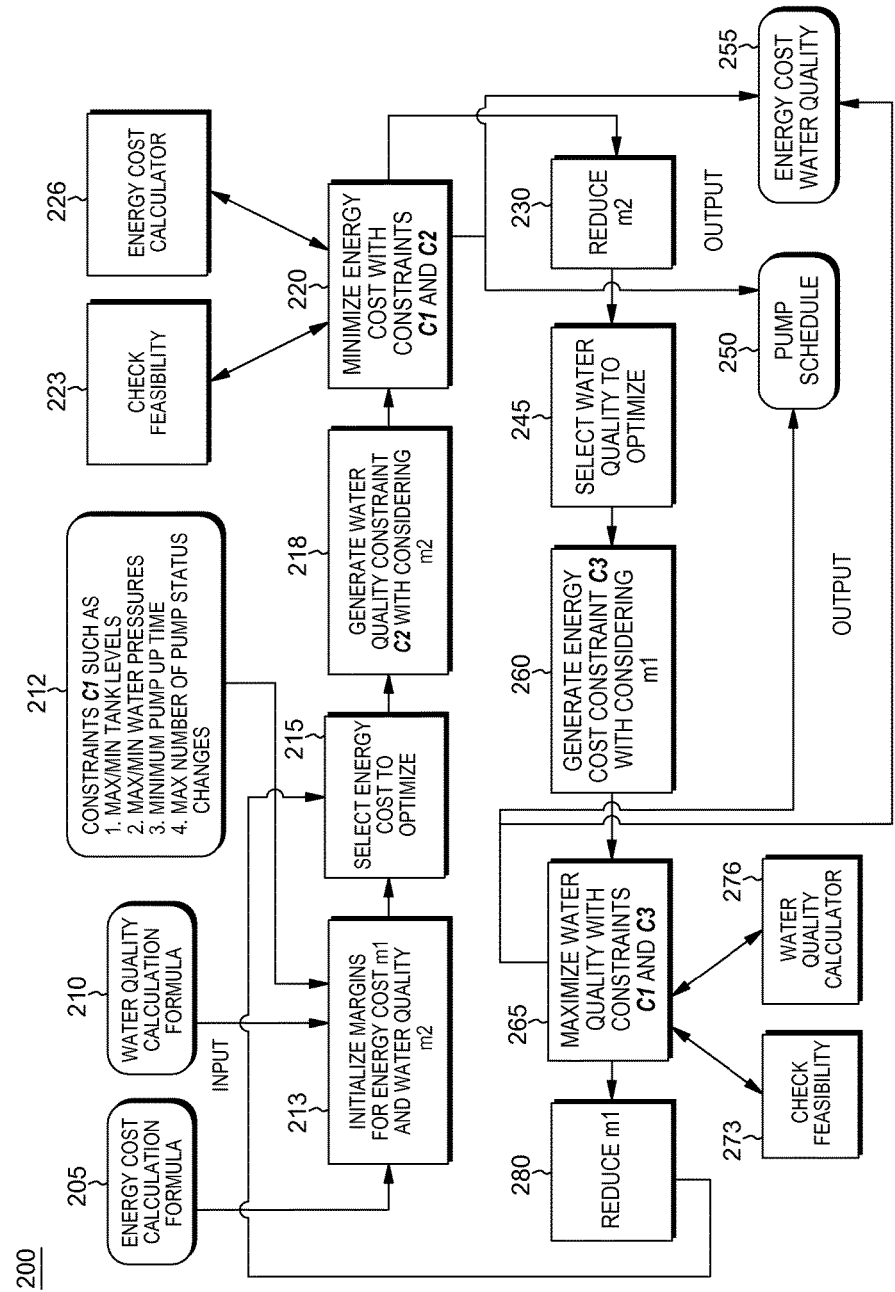
FIG. 3 depicts a specific application 200 using the "multi-objective" scheduling method of FIG. 1 according to an example embodiment.

The analysis system 31 runs instructions to implement methods described in FIGS. 2 and 3 for finding the optimum on/off equipment scheduling. The system runs a programmed solver 25 to iteratively perform simulations in the generating and evaluating of objective functions solutions that are optimal with respect to multiple objectives. Once an optimized output on/off schedule (solution) 35 is found that meets multiple objectives, signals can be communicated, e.g., over a network 99 such as the Internet or a private network, to a control device, e.g., a browser-based device 21, embodied as a computer in the present embodiment, that is communicatively coupled to the on/off equipment 50, e.g., a water pumping system for purposes of description.

In the system 10, an control interface provided at a controller device 21 may be employed to automatically switch on and off the one or more equipment device(s) of a system 50. For example, the solution to the optimization problem produces an automated pumping schedule 35 including on/off times that particular piece of equipment is to operate or not. The schedule 35 may be communicated as signals 60 to a computer controller 21 for the on/off equipment 50. In one embodiment, for automatic scheduling, the computer controller 21 is configured to generate a start and stop signals 75 associated with the generated on/off pump schedule 35. This controller 21 thus would send the signals 75 at the times output by the on/off schedule 35.

Alternatively, with system 31 local to the system 50 of equipment to be controlled, device 30 may generate control signals 65 directly from the computed on/off device schedule 35 for input to and directly controlling on/off of devices of the system 50.

FIG. 2 depicts one example embodiment of analysis method 100 performed at system 31 for on/off control of a piece of equipment 50. Here, system 31 receive inputs including, but not limited to: a list of objectives, e.g., k objectives, represented as a set of objective functions 111 that, with corresponding set(s) 112 of constraints C1 that are applied to the whole optimization problem for the particular objective function. Based on these inputs, the method 100 determines an optimal on/off schedule of a particular system, machine or device. In this example, an objective may relate to turning on/off water pump/filtration system 50 of FIG. 1, while complying with other specified objectives such as cost, water quality, etc.

As referred to herein, an objective function representing an objective is defined by variables, with functions of the variables of interest captured in the objective function, e.g., a minimum or maximum of certain thing, and a constraint (or rule) C1 must be conformed to.

Although not shown in FIG. 2, in the flow 100, prior to the first iteration, it has to be ensured that an initial feasible solution (i.e., on/off schedule) exists that satisfies the given constraints set C1. If no solution initially exists, a feasibility generator is implemented and run prior to the start of the iterative algorithm to create a feasible solution.

Then, in the flow, at 113, the margins for the set of objectives are initialized. As defined herein, a margin is a value of a parameter controlling a constraint of an objective. The margin may represent an amount by which an objective that is not being optimized is allowed to get worse during an iteration of the algorithm. In one embodiment, margins for each objective are initialized by user configuration, for example specifying a percentage of the current objective function. The allowable reduction in margin per iteration is at a fixed rate which also configurable by the user, e.g., via an interface to the device 31 of the system 30 (of FIG. 1). Such an interface for receiving user input is described in further detail with respect to FIG. 6.

In the flow 100, several objectives are desired to be optimized, e.g., k objectives. At 113, margins m1, m2, ..., mk corresponding to each respective objective desired to be optimized are initialized. Here, the flow optimizes one objective at a time in an iterative process by cycling thru the k objectives, by optimizing objective 1, the algorithm 100 will allow objective 2 to worsen a bit during the optimization of objective 1. The amount by which objective 2 is allowed to get worse is controlled by a respective margin, e.g., margin m2. A margin refers to a parameter controlling a constraint of an objective and may be specified by a user for initialization.

In the flow, at 115, one objective "o1" is selected for optimization. Then, at 118, an evaluation is performed such that the system generates constraints C2 for other objectives (not being optimized in the current iteration) with considering margins m_i, where i is 2, ..., k. Here, C2 differs by objective and iteration level. In one embodiment, for reach objective is optimized, there is no longer a margin for that objective, the margins m i are for the remaining objectives that will appear as constraint set C2 in each iteration. In the case of the first objective o1, the system evaluates m_i= 2, ..., k, i.e., the margins that apply to all of the remaining objectives besides o1. C2 changes at each iteration and relates to the objectives that are not being optimized (e.g., o2, o3, etc.) but they are being set with a tolerance (a margin).

Then, continuing at 120, there is performed optimizing the objective function for o1 by solving the objective function using a solver with constraints sets C1 and C2. During the optimization step, the "check feasibility" block 123 and the "evaluate objective" block 126 are called in a manner which may depend on the optimizer chosen. Some optimizers may only call them at the end of an optimization while others may call them many times during the optimization process for a particular objective. The second objective is called o2 and the kth objective is ok. During check feasibility, the optimizer confirms that an interim solution is feasible.

Solving the objective function results in finding a schedule 50 for which equipment is to be switched on/off at different times each with the corresponding cost/benefits. In the solving of the objective function, a determination is made at 123 as to the feasibility of the resulting output schedule. The optimizing block 118 finds a schedule that optimizes costs and benefits and while optimum for o1—but may not necessarily be optimum for o2. It is understood, any optimization technique may be called, and the feasibility check (of the output schedule) at 123 may be performed one or more times in the evaluation and optimizations of o1. The feasibility is such that the output schedule satisfies both the constraints C1 and C2.

The output objective values are the values of the objective functions evaluated at the proposed schedule. Thus, at 126, the method further conducts an evaluation as to the values of the remaining objectives given the current feasible output schedule solution. For example, the schedule for the current iteration is applied to the other remaining objectives to determine their respective values. This is an evaluation as to the values of the remaining objectives given the solution for o1.

Continuing to step 130, there is further performed reducing the margins m_i=2, ..., k, except for the margin of the current iteration. Thus, for the current iteration i=1, margins m_i=2, ..., k are reduced except for the margin m_i=1 corresponding to o1. Generally, for the current iteration i, remaining margins are reduced except for the margin m_i=i corresponding to o_i. In one embodiment, a margin may be reduced by a fixed percentage, e.g., 10% per iteration, or other pre-determined amount per iteration.

Then, after determining the reduced margins except for the current iteration at 130, the process returns to 115 to select the next objective to be processed for optimization in the next iteration using the margin values as prior reduced.

At each iteration of method 100, a different (primary) objective is optimized and a further output schedule 50 that improves the prior output solution in view of the primary objective. In the example, the output solution corresponds to first objective function being for o1 in the first iteration, and then steps 115 to 130 are repeated for the next (primary) objective and succeeding objectives, e.g., corresponding to optimizing second objective o2 and further objectives. In the example of scheduling water pump operation, the next objective o2 may relate to water quality, e.g., an objective to achieve a value of 90%.

The processing steps 115-130 result in generating, at each iteration, a new output schedule corresponding to the new objective to be optimized in the current iteration. At each iteration, the margin relating to the objectives may be reduced by a fixed percentage, or other pre-determined amount. Thus, in the method 100, each of the steps 115-130 are run and the iterations continue until all the margins are reduced to a pre-specified convergence value, e.g., a value at or close to zero (0). At that point, the solution cannot be further improved any more. These steps 115-130 are repeated until the last objective k is optimized, and until all the margin decrements converge to a value at or close to zero (0) or until no feasible solution exists. At this point, the best on/off schedule has been found—providing the best balance for all objectives. In each iteration, the final output schedule generated is feasible (with respect to the constraints) though each objective has different values.

In one embodiment, each of these solutions (produced at each iteration) may be used to create unique pattern in terms of how solutions are improved. That is, at each iteration, the method improves the solution quality of only one objective with preserving the solution quality of the other objectives similar to the current one. This is because the other objectives are converted to constraints as the bottom line quality with allowing for small margins.

After iterating, the method switches to optimize the solution quality of another objective and fix the others as constraints. These procedures are repeated until the method makes no progress in improving the solution quality.

In one embodiment, the iterating to optimize all the objectives may be implemented as a WHILE loop which repeats the processing by returning back to the first objective and repeat the method to further optimize the on/off schedule or try different or varying margin amounts.

In view of the system of FIG. 1, once all received objectives have been considered and related objective functions evaluated and solved in the iterative process 100, the final output schedule output at the last iteration is optimized with respect to all objectives. Signals representative of this final output schedule are generated at the device 30 and can be output as control signals for controlling equipment 50 via local control signals 55 directly input to a controller 21 or remotely via control signals 60 to the controller that directly controls the automated on/off control of the equipment as directed by the output schedule. In one embodiment, signals may be generated that comply with SCADA system (system control and data acquisition) that may utilize such signals to automate on/off control of specific devices.

FIG. 3 depicts the method of FIG. 2 applicable for optimizing an on/off schedule for a water system that includes pumping equipment. In one embodiment, the method could be employed, for example, to determine a schedule for pumping water in way that minimizes energy cost and maximizes water quality as may be of interest for water utility entities. The competing objectives that need to be optimized in this context are the energy consumption, which may be minimized by pumping water into storage while prices are low, and the water quality, which may deteriorate in water that is stored for too long.

FIG. 3 is a method 300 for scheduling on/off powering of equipment that can be employed in the analysis system 31 as shown in FIG. 1. This method can be used to directly control and schedule on/off operation of equipment in a water pumping system 50, or any other system. Thus, in the example operation depicted in FIG. 3, there is considered an example problem of scheduling pumps to minimize energy use while also maximizing water quality. For the pump scheduling objective k would be the energy cost associated with pumping. For the water quality objective k could be the average water age or average concentration of disinfectant.

In the flow 200 of FIG. 3, as with the iterative flow 100 of FIG. 2, several objectives are desired to be optimized: a first objective of energy cost represented by objective function 205, e.g., a energy cost calculation formula that, in one example, may calculate the cost of electricity required in driving the pumps when operating the system, e.g., $1000/unit time; and a second objective of water quality represented by objective function 210, e.g., a water quality calculation formula. In one example, this formula may calculate an average level of concentration of a specific compound in the system to be within some small deviation from a target value, e.g., an average concentration near a target 1 mg/liter (an objective). For the method 200 is provided corresponding set(s) 212 of constraints C1 that are applied to the whole optimization problem for the particular objective function. In the example water pumping system 50 described, these constraints C1 may include, but are not limited to: 1) a maximum tank(s) level(s); 2) maximum water pressures; 3) maximum pump up time; and 4) maximum number of pump status changes.

Continuing to 213, the method initializes the margin m1 corresponding to energy cost objective o1 and initializes margin $m\_2$ corresponding to water quality objective o2. Here, the flow optimizes one objective at a time in an iterative process by cycling thru the two objectives.

In the flow, at 215, the energy cost objective "o1" is selected first for optimization. Then, at 218, an evaluation is performed such that the system generates separate constraints C2 for the water quality objective (not being optimized in the current iteration) with considering margin $m\_1$. In the water pump system example, the deviation may be one constraint of set C2, but also the average age of the water in the system (e.g., 6 hours) may be a further constraint. A current margin constraint for second objective $m\_2$ may be 1 hour, for example, then C2 water age in the system should be less than seven hours (6+1). That is, in this iteration there is tolerated worse quality (increased water age, for example) if it helps lessen the operating costs. It is understood that this margin amounts will decrease in each iteration, and thus when $m\_2$ is reduced in a further iteration, the margin may be ½ hour, for example, such that quality of water is sacrificed (how much worse the water quality can be) when optimizing energy cost again in the second iteration.

Then, continuing at 220, there is performed simulations at the solver for optimizing the objective function for o1 by minimizing the energy cost with constraints C1 and C2 sets applied. In one embodiment, the system may conduct simulation-optimization techniques within a procedure for multi-objective optimization using a simulator in optimizing the objective function at each iteration.

Solving the objective function at 220 results in finding a pump schedule 50 for which the equipment is to be switched on/off at different times that optimizes (minimizes) an energy cost. In the solving of the objective function, a determination is made at 223 as to the feasibility of the resulting output schedule. The optimizing block 220 finds a schedule that optimizes energy costs—but may not necessarily be optimum for maintaining a water quality constraint. It is understood, with the optimization technique called, the feasibility check (of the output schedule) at 223 may be performed one or more times in the evaluation and optimizations of energy cost. The feasibility is such that the output schedule satisfies both the constraints C1 and C2.

Further, at 226, the method further conducts an evaluation of the output solution values (energy cost values calculated from energy cost calculator) given the current schedule 250 of the current feasible solution. This is an evaluation of the value of the objective given the solution for o1.

Continuing to step 230, there is further performed reducing the margin $m\_2$ corresponding to the water quality constraint (e.g., a water age of 6 hours or less). In one embodiment, this margin may be reduced by a fixed percentage, or other pre-determined amount.

Then, after determining the reduced margin at 230, the process continues at 245 where the next objective, e.g., water quality, is selected for optimization. In the example, this may be a water quality constraint being optimized, e.g., programming the pump to optimize the water quality to achieve the lowest water age, while not increasing pumping costs by an amount set by the current margin $m\_1$. Then, with processing at 260, the method generates an energy cost constraint set C3 that considers margin $m\_1$. Then, at 265, the optimization solver component of system 30 maximizes the second objective function corresponding to the water quality objective that applies constraints C1 and C3 in order to produce a pump on/off schedule 250 that maximizes a water quality objective. Here, the constraints C3 may for example indicate obeying the water tank level constraints and pump up times constraints while only increasing the energy costs by only an amount controlled by the margin $m\_1$.

Solving the objective function at 265 results in finding a pump schedule 250 for which the equipment is to be switched on/off at different times that optimizes (minimizes) an energy cost and water quality within the specified margins. In the solving of the objective function, a determination is made at 273 as to the feasibility of the resulting improved output schedule 250. The optimizing block 265 finds a schedule that optimizes energy costs and maximizes a water quality constraint. It is understood, with the optimization technique called, the feasibility check (of the output schedule) at 273 may be performed one or more times in the evaluation and optimizations of energy cost. The feasibility is such that the output schedule satisfies both the constraints C1 and C3.

Further, at 276, the method further conducts an evaluation of the water quality output solution values (i.e., water quality values calculated from water quality calculator) given the current schedule 250 of the current feasible solution. This is an evaluation of the corresponding energy cost and water quality objective values output at 255.

Continuing to 280, there is further performed reducing the margin $m\_1$ corresponding to the energy cost constraint, and the process proceeds to step 215. In one embodiment, this margin may be reduced by a fixed percentage, e.g., 20% to 10%, or reduced by some other pre-determined amount. Thus, in the method 200, each of the steps 215-280 to optimize each of the objective functions and continue until all the margins m_1 and m_2 have been reduced to a pre-specified convergence value, e.g., at or close to zero, or until no feasible solution exists.

Thus, in one embodiment, the method 200 may implement a WHILE loop to govern the repeat processing by returning back to the first objective and further optimize the output on/off schedule 250 in view of the primary objective (e.g., water quality).

In view of the system of FIG. 1, once all to received objectives have been considered and related objective functions evaluated and solved in the iterative process 200, the final schedule output 250 at the last iteration is optimized with respect to the energy cost and water quality objectives. In this example, an on/off schedule solution output provides the times for turning each pump in the system on and off in the system. Candidate schedules are generated at each iteration of the optimization step with a final schedule output when all of the objective functions have been iterated.

Here, the final output schedule has the property that, as a result of the second iteration, the output values of the solution in which the second objective function (o2) was the primary objective, are improved, as compared to the previous schedule output values for the second objective evaluation when performing the first objective optimization in the first iteration. Further, in this example, the final output schedule has the property that, as a result of the second iteration processing, the output values of the solution in which the first objective function (o1) was not the primary objective, are reduced (i.e., less optimized) but within the margin (tolerance) as allowed.

In one embodiment, the methods 100 of FIG. 2 and methods 200 of FIG. 3 are implemented as part of a decision support software application. However, generated outputs can be further implemented as instructions for operating the on/off control of one or more devices. That is, in view of FIG. 1, using the output schedule, signals 65 may be generated at specified times—the generated signals being output for directly controlling equipment 50. Alternatively, using the output schedule, signals 60 including output on/off timing schedule for one or more devices may be communicated remotely over a network generated at specified times—the generated signals being received by controller device 21 for automatic on/off control of the equipment 50 via on/off control signals 75 as directed by the output schedule.

In one embodiment, signals 65, 75 may be generated that comply with SCADA system (system control and data acquisition) that may utilize such signals to automate on/off control of specific devices.

It is understood that the methods 100 of FIG. 2 and methods 200 of FIG. 3 can be modified for optimizing on/off device scheduling for multiple devices or pieces of equipment desired to be controlled on/off.

Figure 4:
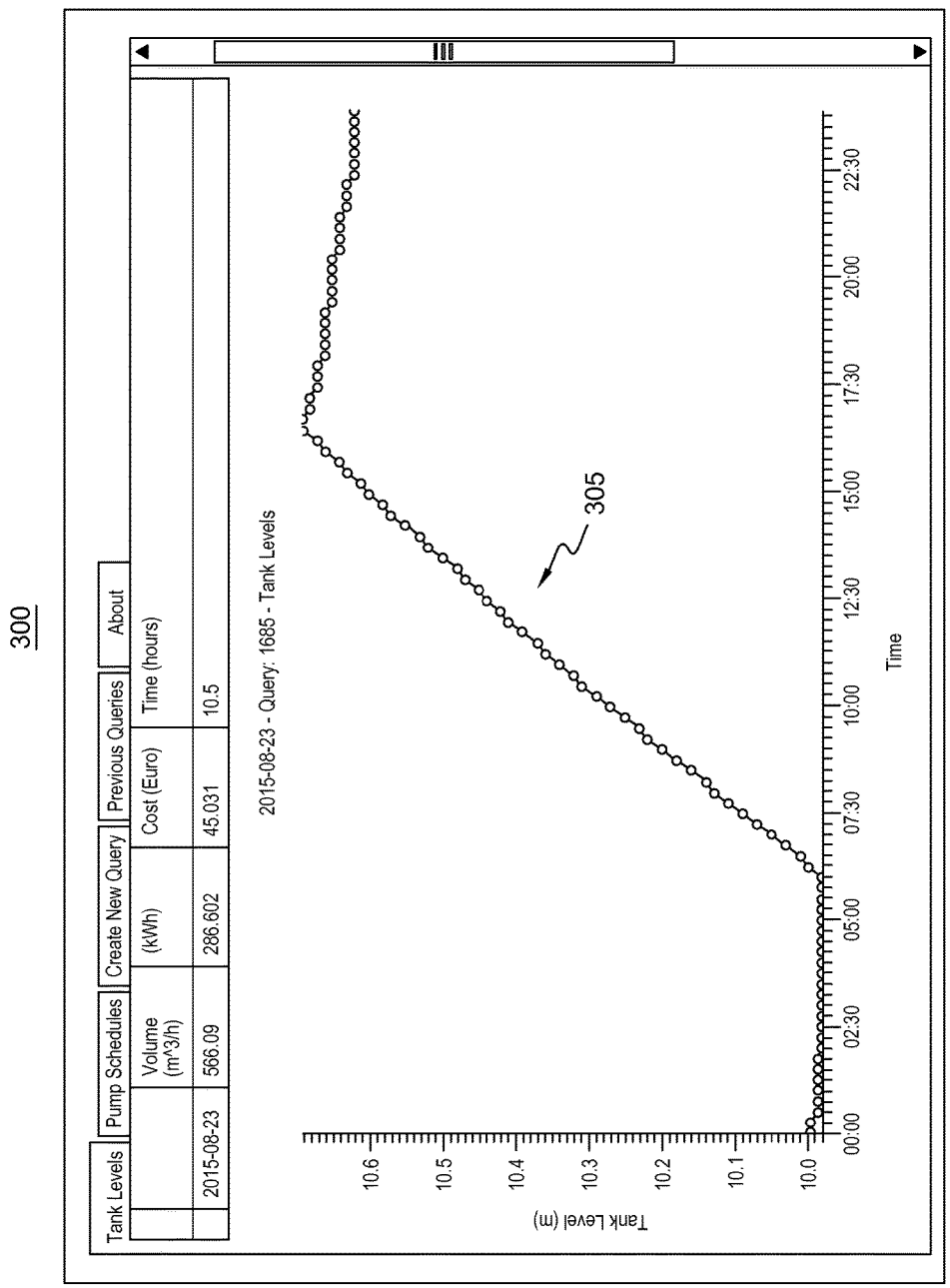
FIG. 4 depicts an example output schedule 300 visualization of a plot of a water tank level during a determined time interval in which certain pumps have been shut off under control of an output schedule generated using the method 200 of FIG. 3.
Figure 5:
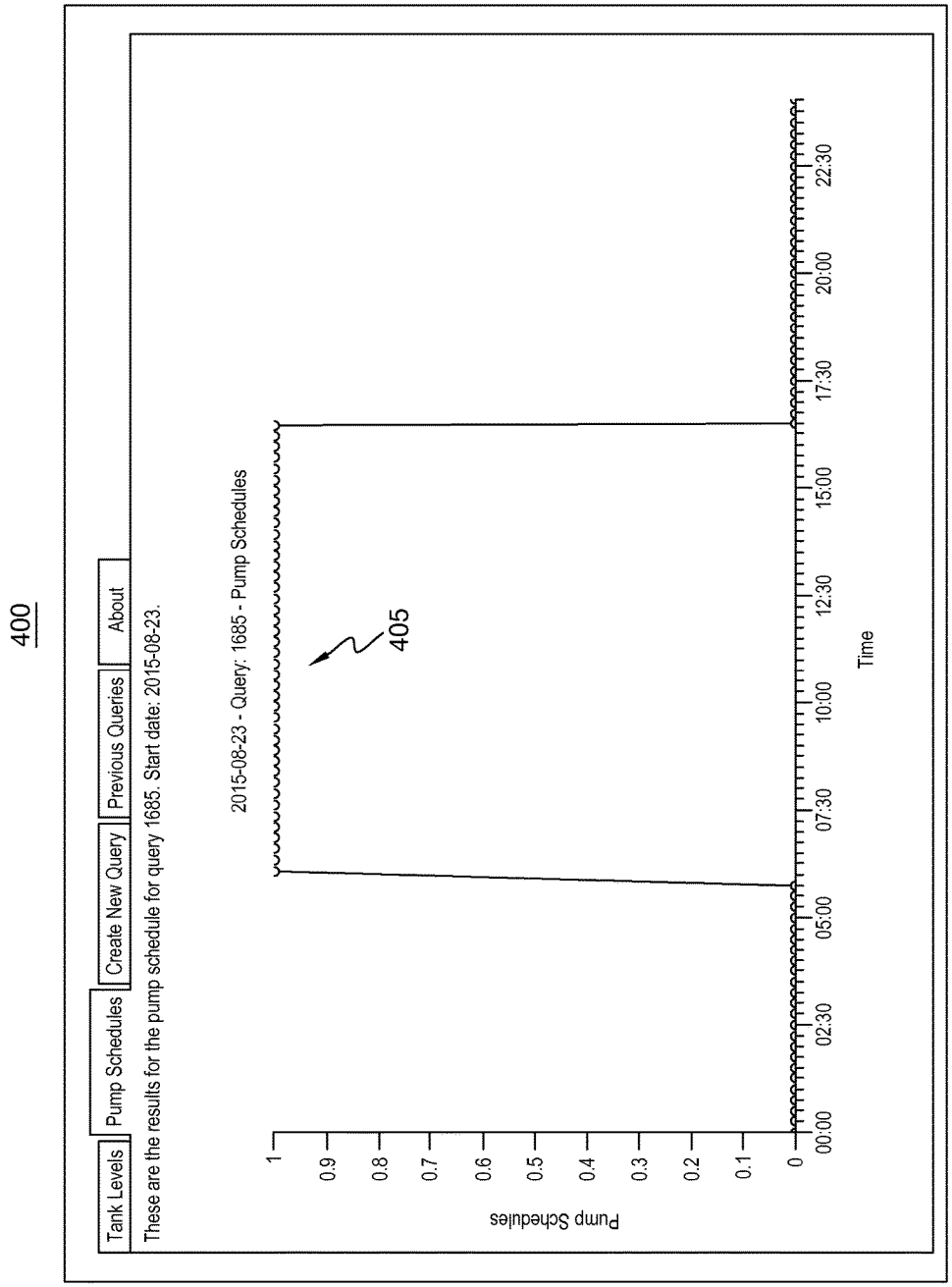
FIG. 5 shows a plot of the on/off control schedule 400 of a water pump device with the pump devices shown activated (e.g., turned on) during the determined time interval.

An example output schedule 300 after a second iteration is shown in FIG. 4. The schedule 300 is currently output in a JSON (Java-Script Object Notation) format with one possible visualization 305 depicted in FIG. 4. The visualization shown in FIG. 4 illustrates example plot 305 of water tank levels over time showing the tank levels in a determined time interval in which certain pumps have been shut off under control of the output schedule. More particularly, FIG. 5 shows a plot of the on/off control schedule 400 of a water pump device with the pump devices shown activated (e.g., turned on) during a time interval 405. The water tank levels 305 shown in the plot of FIG. 4 is a result of the activating of the water pumps during the time interval 405 in the schedule output of FIG. 5. Here, the system 50 may use to methods for the purpose of on/off scheduling of constant-speed pumps.

Other examples of equipment that could be controlled using the methods herein include air conditioning (A.C.) equipment. For instance, schedule may be produce for on/off controlling of air-conditioning equipment to minimize energy costs and temperature fluctuations which is of concern for residential, commercial and industrial buildings. Minimizing temperature fluctuations often requires frequent switching of the air conditioning system. However, frequent switching may require operation when energy prices are high.

Other examples of equipment that could be controlled using the methods herein include refrigeration equipment, cellular networks, maintenance for electricity generators, circulation for home or business (industrial use). For example, in wireless cellular networks, transmission towers consume the majority (>80%) of total energy needed for operation. Energy efficient approaches to reduce power consumption rely on switching transmission towers on and off depending on traffic demands and locations. The competing objectives that need to be optimized in this context are the energy consumption which needs to be minimized by switching transmission towers off while quality of service needs to be maximized by switching transmission towers on.

Further, as maintenance costs are a major expense for Electricity generators and distributors, the methods herein may be used to control on/off equipments that typically require that parts of the electricity grid (generators, distribution lines, etc) be disconnected during maintenance. The schedules for turning on and off equipments for maintenance are optimized taking into account the urgency of the maintenance, the location and size of the demand, and the capacity of the remainder of the network to support the demand. The competing objectives that need to be optimized are the amount of time in which equipments are turned off to allow maintenance while it is desired to keep the equipments operating as long as possible to allow low cost generation and distribution of power.

Figure 6:
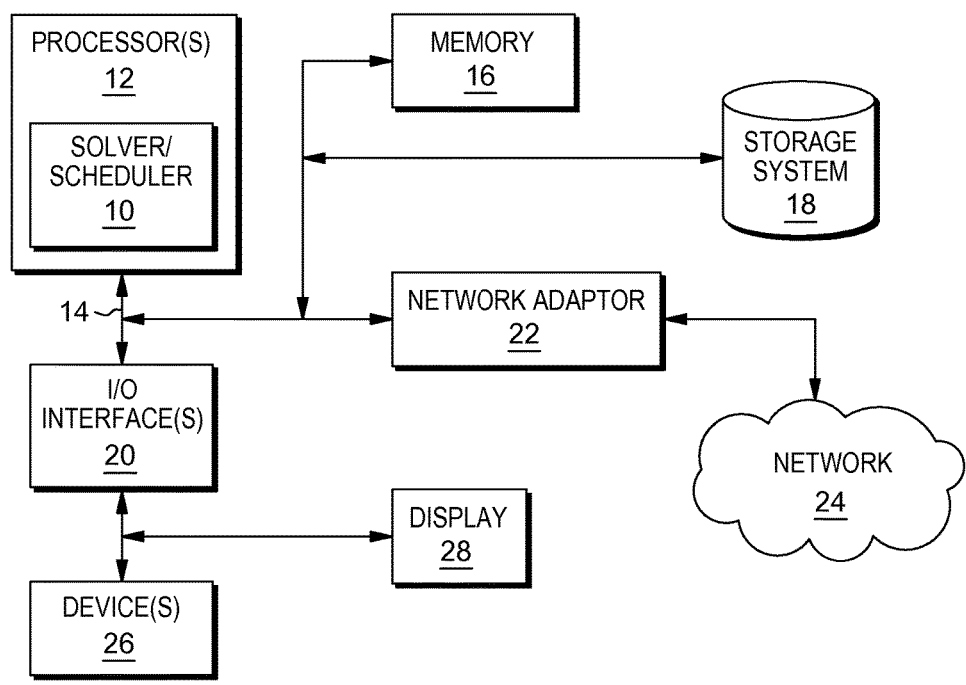
FIG. 6 depicts an exemplary hardware configuration for performing methods such as described in FIGS. 2-3 in one embodiment.

FIG. 6 illustrates a schematic of an example computer or processing system that may implement the on/off scheduling of equipment in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of scheduling on/off control of a piece of one or more pieces of equipment of a system comprising:
   receiving at a processing device, a selection of a system objective from among of a plurality of objectives achieved or impacted by turning on or off one or more pieces of equipment; the system objective represented by a corresponding objective function;
   receiving, at the processing device, an input margin setting for the objective representing an allowable deviation margin by which an objective may worsen during an iteration;
   providing a current solution to the corresponding objective function;
   iteratively evaluating a different objective and solving a corresponding objective function with respect to the current solution to optimize the current solution with respect to multiple objectives, and at each iteration, changing the margin setting value for every other objective not being evaluated in the current iteration to enforce a range by which said every other objective can be worsened at the current iteration;
   terminating the iterations to obtain a final solution comprising a schedule of times for on/off control of said one or more pieces of equipment, the schedule being optimal with respect to the multiple objectives;
   generating signals based on the schedule of on/off times for controlling said one or more pieces of equipment; and
   turning on or off said one or more pieces of equipment using said signals.

2. The method of claim 1, wherein the terminating of the iterations comprises:
   determining when all the margins are reduced to a pre-specified convergence value, or
   determining when said iterations no longer progress in improving a solution quality.

3. The method of claim 2, further comprising:
   decreasing, at each iteration, the allowable deviation margin for all the objective functions; and
   optionally restarting the evaluating iterations.

4. The method of claim 3, further comprising:
   generating at each iteration a current solution that is a feasible solution comprising a schedule that satisfies constraints associated with the objective.

5. The method of claim 1, further comprising, at a first iteration,
receiving, at the processor device, a specified first constraint set having initialized one or more constraint values associated with the corresponding first objective function being evaluated; and at each subsequent iteration,
said evaluating including generating a second set of constraints for the current the objective functions not being optimized during the current iteration, the second set of constraints being generated based on a prior objective value and the margin setting, and
applying said first set and second constraint sets in solving each objective function at the current iteration.

6. The method of claim 5, wherein said iteratively evaluating said objective function with respect to a different one of the objectives follows a predetermined order, while at each iteration enforcing a maximum allowable deviation on the other objective functions by setting them as constraints.

7. The method of claim 5, further comprising, prior to said iteratively evaluating:
determining if a feasible solution is currently available that satisfies said first constraints set, and if a feasible solution is not currently available,
using a feasibility generator to generate a solution that satisfy the first constraints set without optimizing the other objective functions.

8. The method of claim 5, using a simulator to apply, at each iteration, simulation-optimization techniques within a procedure for multi-objective optimization.

9. The method of claim 1, wherein said generated signals comply with a system control and data acquisition (SCADA) system standard for use in automating on/off control of said one or more pieces of equipment.

10. An apparatus for scheduling on/off control of a piece of one or more pieces of equipment of a system, the apparatus comprising:
a memory storage device storing a program of instructions;
a processor device receiving said program of instructions to configure said processor device to:
receive a selection of a system objective from among of a plurality of objectives achieved or impacted by turning on or off one or more pieces of equipment; the system objective represented by a corresponding objective function;
receive an input margin setting for the objective representing an allowable deviation margin by which an objective may worsen during an iteration;
provide a current solution to the corresponding objective function;
iteratively evaluating a different objective and solving a corresponding objective function with respect to the current solution to optimize the current solution with respect to multiple objectives, and at each iteration, changing the margin setting value for every other objective not being evaluated in the current iteration to enforce a range by which said every other objective can be worsened at the current iteration;
terminate the iterations to obtain a final solution comprising a schedule of times for on/off control of said one or more pieces of equipment, the schedule being optimal with respect to the multiple objectives;
generate signals based on the schedule of on/off times for controlling said one or more pieces of equipment; and
turn on or off said one or more pieces of equipment using said signals.

11. The apparatus of claim 10, wherein to terminate the iterations, the processor device is further configured to:
determine when all the margins are reduced to a pre-specified convergence value, or
determine when said iterations no longer progress in improving a solution quality.

12. The apparatus of claim 11, wherein the processor device is further configured to:
decrease, at each iteration, the allowable deviation margin for all the objective functions; and
optionally restart the evaluating iterations.

13. The apparatus of claim 12, wherein said processor device is further configured to:
generate at each iteration a current solution that is a feasible solution comprising a schedule that satisfies constraints associated with the objective.

14. The apparatus of claim 10, wherein at a first iteration, the processor device is further configured to:
receive a specified first constraint set having initialized one or more constraint values associated with the corresponding first objective function being evaluated; and
at each subsequent iteration,
said evaluating including generating a second set of constraints for the current the objective functions not being optimized during the current iteration, the second set of constraints being generated based on a prior objective value and the margin setting, and
applying said first set and second constraint sets in solving each objective function at the current iteration.

15. The apparatus of claim 14, wherein said iteratively evaluating said objective function with respect to a different one of the objectives follows a predetermined order, wherein, at each iteration, a maximum allowable deviation on the other objective functions is enforced by setting them as constraints.

16. The apparatus of claim 14, wherein prior to said iteratively evaluating, said processor device is further configured to:
determine if a feasible solution is currently available that satisfies said first constraints set, and if a feasible solution is not currently available,
use a feasibility generator to generate a solution that satisfy the first constraints set without optimizing the other objective functions.

17. The apparatus of claim 14, wherein said processor device is further configured to call upon a simulator to apply, at each iteration, simulation-optimization techniques within a procedure for multi-objective optimization.

18. The apparatus of claim 10, wherein said generated signals comply with a system control and data acquisition (SCADA) system standard for use in automating on/off control of said one or more pieces of equipment.

19. A computer readable storage medium, tangible embodying a program of instructions executable by the computer for automatically scheduling on/off control of a piece of one or more pieces of equipment of a system, the program of instructions, when executing, performing the following steps:
receiving at a processing device, a selection of a system objective from among of a plurality of objectives achieved or impacted by turning on or off one or more pieces of equipment; the system objective represented by a corresponding objective function;

receiving, at the processing device, an input margin setting for the objective representing an allowable deviation margin by which an objective may worsen during an iteration;

providing a current solution to the corresponding objective function;

iteratively evaluating a different objective and solving a corresponding objective function with respect to the current solution to optimize the current solution with respect to multiple objectives, and at each iteration, changing the margin setting value for every other objective not being evaluated in the current iteration to enforce a range by which said every other objective can be worsened at the current iteration;

terminating the iterations to obtain a final solution comprising a schedule of times for on/off control of said one or more pieces of equipment, the schedule being optimal with respect to the multiple objectives;

generating signals based on the schedule of on/off times for controlling said one or more pieces of equipment; and turning on or off said one or more pieces of equipment using said signals.

20. The computer readable storage medium of claim 19, wherein the terminating of the iterations comprises:

determining when all the margins are reduced to a prespecified convergence value, or determining when said iterations no longer progress in improving a solution quality.

21. The computer readable storage medium of claim 20, further comprising:

decreasing, at each iteration, the allowable deviation margin for all the objective functions; and optionally restarting the evaluating iterations.

22. The computer readable storage medium of claim 19, further comprising, at a first iteration, receiving, at the processor device, a specified first constraint set having initialized one or more constraint values associated with the corresponding first objective function being evaluated; and at each subsequent iteration, said evaluating including generating a second set of constraints for the current the objective functions not being optimized during the current iteration, the second set of constraints being generated based on a prior objective value and the margin setting, and applying said first set and second constraint sets in solving each objective function at the current iteration.

* * * * *